United States Patent [19]
Aoki et al.

[11] Patent Number: 5,464,084
[45] Date of Patent: Nov. 7, 1995

[54] MAIN CLUTCH CONNECTING SYSTEM HAVING A PILOT CLUTCH

[75] Inventors: Jun Aoki; Katsuhiko Masuda; Isamu Hashizume, all of Wako, Japan

[73] Assignee: Honda Giken Kogyo Kabushiki Kaisha, Tokyo, Japan

[21] Appl. No.: 201,955

[22] Filed: Feb. 25, 1994

[30] Foreign Application Priority Data

Feb. 26, 1993 [JP] Japan .................... 5-038479
Feb. 26, 1993 [JP] Japan .................... 5-038480
Feb. 26, 1993 [JP] Japan .................... 5-038481

[51] Int. Cl.⁶ .................... F16D 27/115; F16H 48/24
[52] U.S. Cl. .................... 192/35; 192/48.2; 192/93 A; 475/150; 475/249
[58] Field of Search .................... 192/35, 48.2, 70.2, 192/84 A, 84 B, 93 A, 109 R; 475/150, 154, 231, 249

[56] References Cited

U.S. PATENT DOCUMENTS

| | | | |
|---|---|---|---|
| 2,933,171 | 4/1960 | Kraeplin | 192/35 |
| 2,937,729 | 5/1960 | Sperr | 192/84 |
| 4,068,747 | 1/1978 | Snoy | 192/70.2 X |
| 4,645,049 | 2/1987 | Matsuda et al. | 192/35 |
| 4,836,351 | 6/1989 | Janiszewski | 192/70.2 X |
| 5,269,730 | 12/1993 | Hirota | 475/150 |
| 5,326,333 | 7/1994 | Niizawa et al. | 475/249 |
| 5,366,421 | 11/1994 | Hirota | 475/231 |

FOREIGN PATENT DOCUMENTS

| | | |
|---|---|---|
| 2209879 | 9/1972 | Germany . |
| 3609418 | 10/1986 | Germany . |
| 4124894 | 2/1992 | Germany . |
| 3-219123 | 9/1991 | Japan . |
| 4-64747 | 2/1992 | Japan .................... 475/150 |
| 4-83918 | 3/1992 | Japan .................... 192/48.2 |
| 4-107347 | 4/1992 | Japan . |
| 4-151025 | 5/1992 | Japan .................... 192/35 |
| 4-181026 | 6/1992 | Japan .................... 192/35 |
| 4-185917 | 7/1992 | Japan .................... 192/35 |
| 315800 | 8/1956 | Switzerland . |
| 1204007 | 9/1970 | United Kingdom . |
| WO86/02133 | 4/1986 | WIPO . |

*Primary Examiner*—Richard M. Lorence
*Attorney, Agent, or Firm*—Armstrong, Westerman, Hattori, McLeland and Naughton

[57] ABSTRACT

A connecting system which includes a pilot clutch brought into an engaged state by an actuator, a cam member operated by an engaging force of the pilot clutch, an urging member driven and moved by the cam member, and a main clutch brought into an engaged state by a movement of the urging member. The cam member includes a first cam ring restrained by the pilot clutch, a second cam ring provided on the urging member, and rolling members interposed the first and second cam rings for converting the relative rotation of the cam rings into a thrust. The system further includes a biasing member for biasing the urging member and the first cam ring in a direction of abutment against each other in order to generate a frictional force between the urging member and the first cam ring. Thus, it is possible to prevent the engaging force of the main clutch from being influenced by a drag torque produced in the pilot clutch.

23 Claims, 8 Drawing Sheets

MAIN CLUTCH CONNECTING SYSTEM HAVING A PILOT CLUTCH

BACKGROUND OF THE INVENTION

1. Field of the Invention

The present invention relates to a connecting system, including a pilot clutch brought into an engaged state by an actuator, a cam means operated by an engaging force of the pilot clutch, an urging member driven and moved by the cam means, and a main clutch brought into an engaged state by a movement of the urging member, the cam means including a first cam ring restrained by the pilot clutch, a second cam ring provided on the urging member, and a rolling member interposed between the first and second cam rings for converting the relative rotation of the cam rings into a thrust.

2. Description of the Prior Art

There are such conventionally known connecting systems described in Japanese Patent Application Laid-open Nos. 219123/91 and 107347/92. These conventional connecting systems were applied to a differential motion limiting mechanism in a differential in an automobile so as to control the differential motion limiting mechanism, by utilizing an engaging force of the pilot clutch and bringing the main clutch into its engaged state.

In the above prior art connecting systems, a drag torque may be generated, in some cases, in the pilot clutch, due to the viscosity of oil, particularly at a low temperature, or the like. This drag torque may be applied to the first cam ring to bring about a relative rotation between both the first and second cam rings, thereby bringing the main clutch into its engaged state to generate a differential motion limiting force larger than necessary.

SUMMARY OF THE INVENTION

Accordingly, it is an object of the present invention to limit the operation of a cam mechanism, due to the drag torque in the pilot clutch, to stabilize the engaging force of the main clutch.

To achieve the above object, according to the present invention, there is provided a connecting system comprising a pilot clutch, brought into an engaged state by an actuator, a cam means, operated by an engaging force of the pilot clutch, an urging member driven and moved by the cam means, and a main clutch, brought into an engaged state by a movement of the urging member, the cam means being comprised of a first cam ring restrained by the pilot clutch, a second cam ring provided on the urging member, and a rolling member interposed between the first and second cam rings for converting the relative rotation of the both cam rings into a thrust, wherein the system further includes a biasing means for biasing the urging member and the first cam ring toward an abutment against each other in order to generate a frictional force between the urging member and the first cam ring.

With the above construction, it is possible to bring the first cam ring and the urging member into integral abutment against each other by biasing the urging member and the first cam ring by the biasing means towards each other there by to generate a frictional force between the urging member and the first cam ring by their mutual abutment. Therefore, even if the first cam ring tends to rotate with respect to the second cam ring by a drag torque generated in the pilot clutch, a given restraining force acts to inhibit the operation of the cam means. Thus, the engaging force of the main clutch is stabilized.

In addition to the construction proposed above, the second cam ring may be relatively movably supported on the urging member, and a gap may be formed between the urging member and the second cam ring, when the pilot clutch is in a non-engaged state. With such a construction, the second cam ring can be provided with a play to form a dead zone or dead bank in the cam means, thereby preventing a sudden engagement of the main clutch.

In addition to the construction proposed above, if the main clutch is biased in an engaging direction by the biasing means, the main clutch can exhibit an engaging force without operation of the pilot clutch. Thus, when the connecting system, according to the present invention, is applied, for example, to an automobile, it is possible to improve the stability of the automobile against a side wind during traveling of the automobile at a high speed and, moreover, to prevent the wastage and deterioration of the actuator for the pilot clutch.

Further, in addition to the construction proposed above, if a phase angle adjusting means for centering the first and second cam ring is provided, it is possible to bring the main clutch into its engaged state with an equal responsiveness irrespective of the direction of relative rotation of both the cam rings.

Yet further, in addition to the construction proposed above, if a limiting means for limiting an upper limit of angle of the relative rotation between the first and second cam rings is provided, it is possible to avoid an excessive increase in the angle of the relative rotation between both the cam rings to prevent a locking of the main clutch.

Yet further, in addition to the construction proposed above, if the number of projections of clutch disks of the pilot clutch engaging grooves of a serration formed on the first cam ring of the cam mechanism is smaller than the number of grooves in the serration, the projections can be broken to minimize the damage, when an excessive load is applied to the pilot clutch. Moreover, it is possible to improve the lubrication of the pilot clutch by oil retained in such grooves of the serration which are not engaged by the projections.

Yet further, in addition to the construction proposed above, if grooves are formed in projections of clutch disks of the pilot clutch which engage grooves a serration formed on the first cam ring of the cam mechanism, the projections can be broken at their grooves to minimize damage, when an excessive load is applied to the pilot clutch. Moreover, it is possible to improve the lubrication of the pilot clutch by oil retained in the grooves in the projections.

Yet, further, if the limiting means is comprised of a cam groove supporting the rolling member, and a projection engaging the cam groove, which projection is disposed radially outside the rolling member supported in the cam groove, it is possible to prevent the rolling member from being ejected by centrifugal force.

Yet further, in addition to the construction proposed above, the connecting system may further include a casing which is rotatable and which accommodates the pilot clutch, an armature attracted and moved by a solenoid to bring the pilot clutch into its engaged state, the cam means, the urging member and the main clutch. An outer periphery of the armature may be engaged with the casing in such a manner that the relative rotation of the armature relative to the casing is limited, and the axial movement relative to the casing is permitted. With such a construction, it is possible not only to reduce the deflection of the armature to stabilize the rotation thereof, but also to separate the armature from the first cam ring to reduce the inertia moment of the first cam ring, thereby reducing the load of the pilot clutch.

Yet further, if the outer periphery of the armature is engaged with the casing with the rolling members interposed there between, it is possible to smoothly move the armature and, moreover, to reduce the area of contact between the casing and the armature to prevent a reduction in magnetic force of the solenoid.

Yet further, if the end of movement of the armature is limited by a C-clip locked to the casing, and a gap between opened ends of the C-clip is set smaller than the outside diameter of the rolling member, it is possible to retain the rolling member by utilizing the C-clip for limiting the end of movement of the armature and, moreover, to prevent the falling-off of the rolling member from the opened ends of the C-clip.

The above and other objects, features and advantages of the invention will become apparent from the following description of preferred embodiments, taken in conjunction with the accompanying drawings.

BRIEF DESCRIPTION OF THE DRAWINGS

FIGS. 1 to 10 illustrate a first embodiment in which the present invention is applied to a differential motion limiting mechanism in an automobile, wherein

FIG. 11 and 12 illustrate a second embodiment in which the present invention is applied to a differential motion limiting mechanism an automobile, wherein

DESCRIPTION OF THE PREFERRED EMBODIMENTS

A first embodiment of the present invention will now be described in connection with FIGS. 1 to 10.

Figure 1:
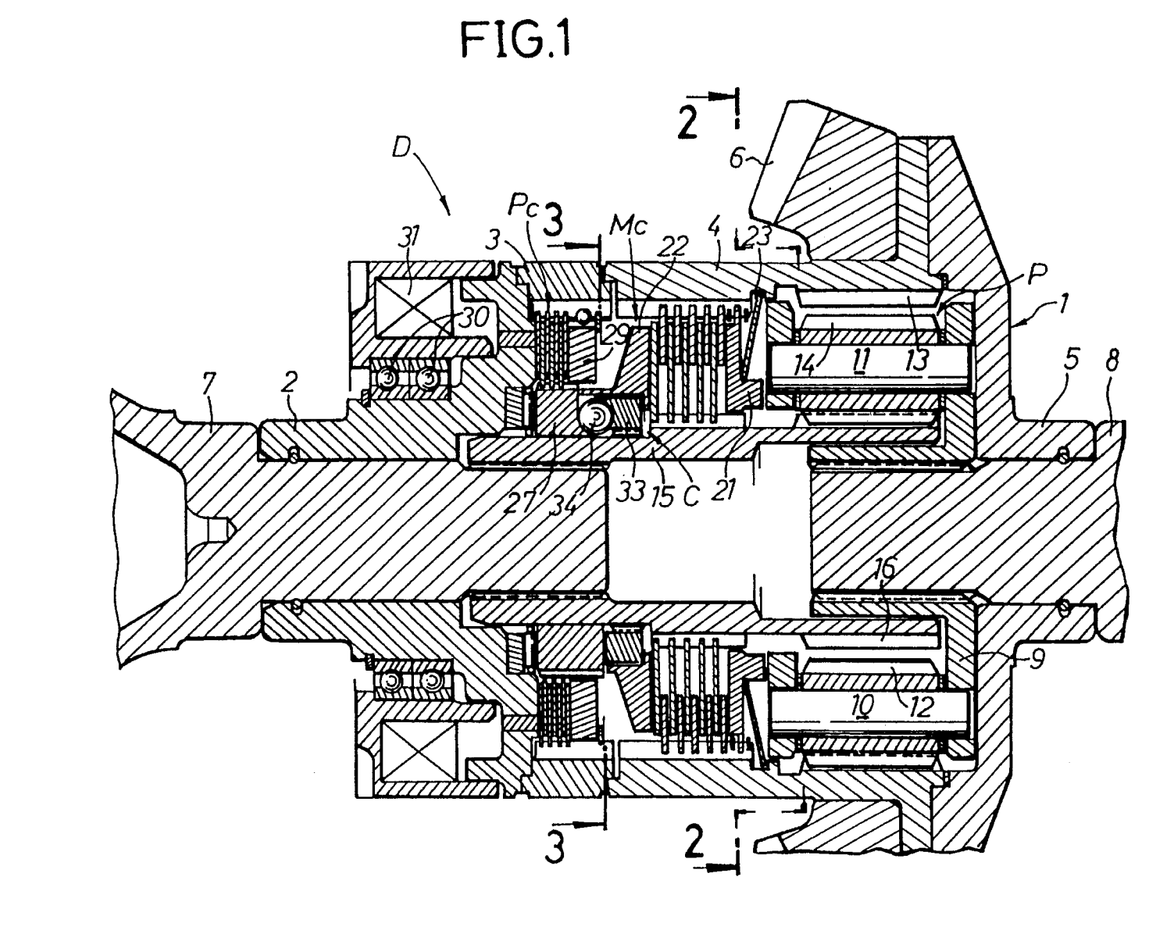
FIG. 1 is a longitudinal sectional view of a rear differential.

FIG. 1 illustrates a rear differential D in an automobile equipped with a differential motion limiting mechanism. The rear differential D has a differential case 1 which is axially divided into four parts, i.e., includes a left casing 2, an intermediate casing 3, a center casing 4 and a right casing 5 which are integrally coupled together. A follower bevel gear 6 is secured to the center casing 4 and meshed with a driving bevel gear (not shown) and is driven thereby. The driving bevel gear is provided at a rear end of a propeller shaft (not shown) extending in a longitudinal direction of a vehicle body. A left axle 7 is rotatably supported in the left casing 2 and connected to a left rear wheel (not shown). A right axle 8 is rotatably supported in the right casing 5 and connected to a right rear wheel (also, not shown ).

Figure 2:
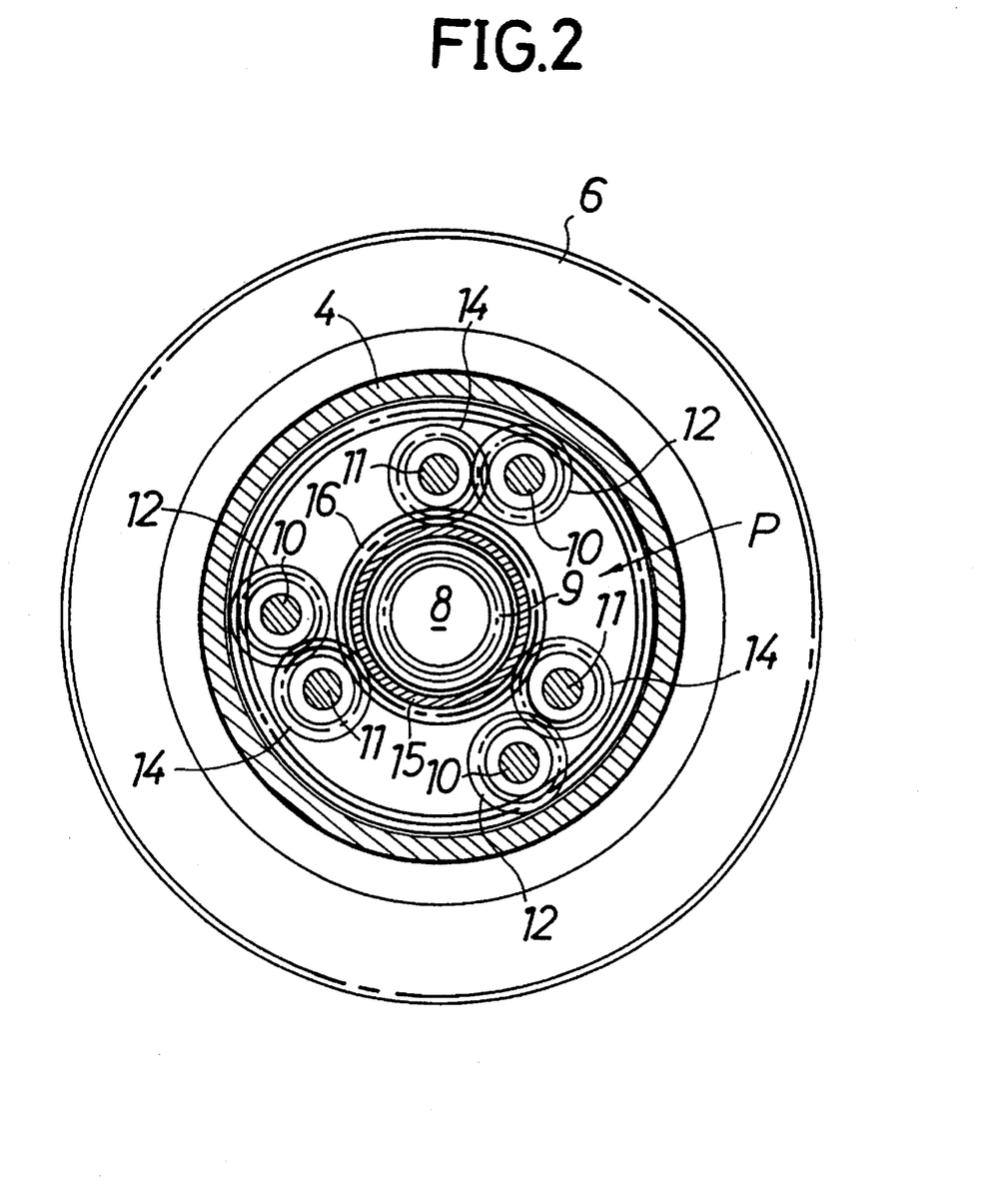
FIG. 2 is a sectional view taken along a line 2—2 in FIG. 1.

As can be seen from reference to FIGS. 1 and 2, a planetary gear type differential P is accommodated within the differential case 1 for transmitting a driving force received into the differential case 1 to the left and right axles 7 and 8 and for absorbing a difference in number of revolutions between the axles 7 and 8. The differential P includes a planetary gear carrier 9 spline-coupled to the right axle 8. Three pairs of outer planetary gear shafts 10 and inner planetary gear shafts 11 are provided on the planetary gear carrier 9 at distances of 120°, respectively.

An outer planetary gear 12, carried on the outer planetary gear shaft 10, is meshed with a ring gear 13 formed around an inner periphery of the center casing 4 and with an inner planetary gear 14 carried on the inner planetary gear shaft 11. In addition to the outer planetary gear 12, the inner planetary gear 14 is meshed with a sun gear 16 formed around an outer periphery at a right end of a sleeve 15 spline-coupled to the left axle 7.

The structure of a main clutch Mc for bringing the center casing 4, having the ring gear 13, and the sleeve 15, having the sun gear 16, into integral engagement with each other to generate a differential motion limiting force will be described below.

Figure 4:
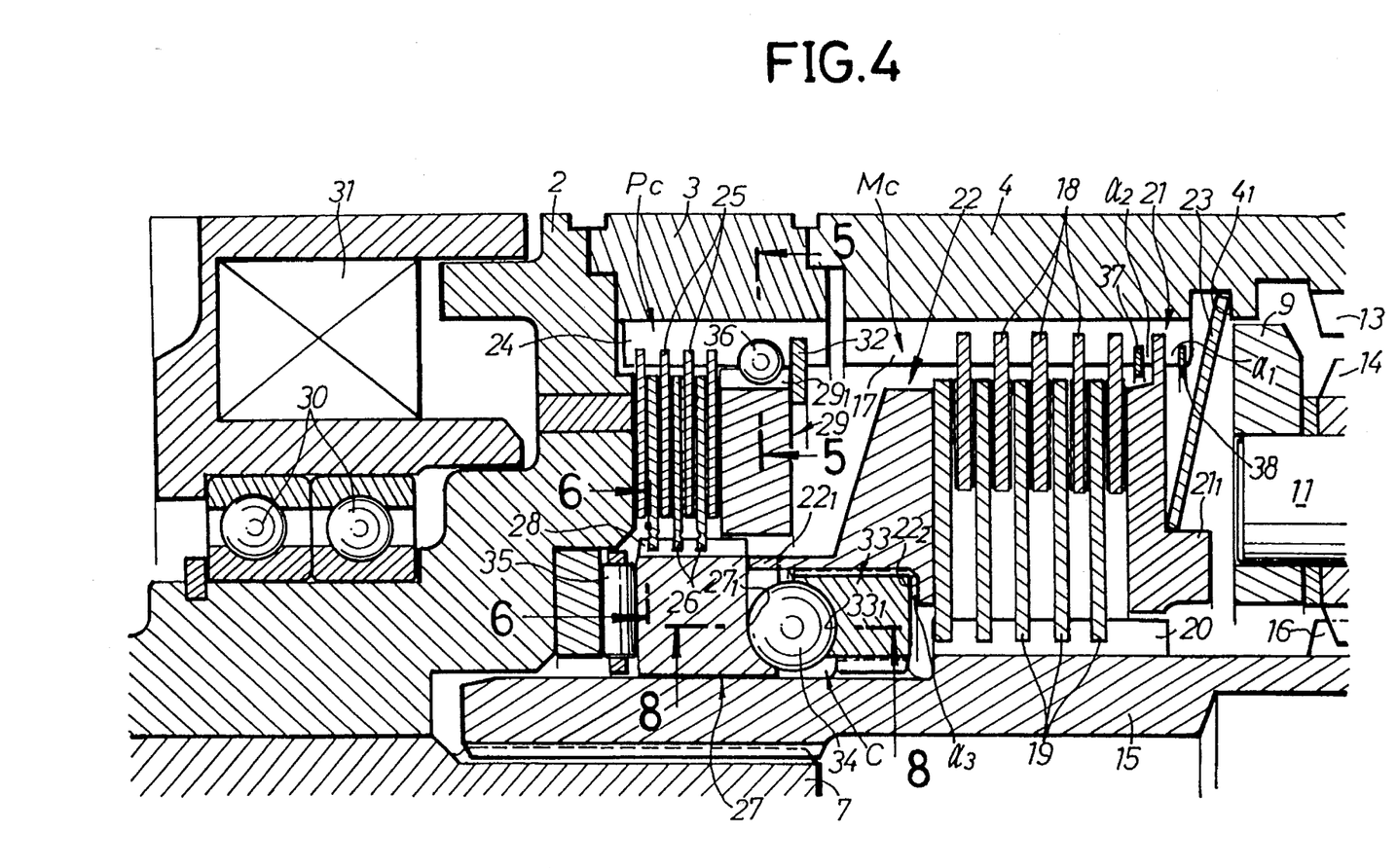
FIG. 4 is an enlarged view of an essential portion shown in FIG. 1.

Referring to FIG. 4, a plurality of main clutch outer disks 18 are axially slidably supported in a serration 17 formed around an inner periphery of the center casing 4. A plurality of main clutch inner disks 19 are axially slidably supported in a serration 20 formed around an outer periphery of the sleeve 15. The main clutch inner disks 19 are alternately superposed on the main clutch outer disks 18. An annular stop plate 21 is disposed to the right side of the rightmost main clutch outer disk 18 and has an outer periphery supported on the serration 17 of the center casing 4. The stop plate 21 is axially slidable along with the main clutch outer disks 18 and the main clutch inner disks 19. The sliding movement of the stop plate 21 is limited to a range between a pair of C-clips 37 and 38 engaging the serration 17. An annular pressure plate 22, which will be described hereinafter, is disposed to the left side of the left most main clutch inner disk 19.

A belleville spring 23 is interposed between a locking step $21_1$ formed on a right side of the stop plate 21 and a locking step $4_1$ formed on the inner periphery of the center casing 4. The belleville spring 23 biases the stop plate 21 leftwardly, i.e., in a direction to bring the main clutch outer disks 18 and the main clutch inner disks 19 into contact with each other, thereby causing the main clutch Mc to generate an initial engaging force.

In a condition in which the main clutch Mc is generating the initial engaging force, a gap $\alpha_1$ permitting a rightward movement of the stop plate 21 is formed between the outer periphery of the stop plate 21 and the right C-clip 38. A slight gap $\alpha_2$ permitting a leftward movement of the stop plate 21 is formed between the outer periphery of the stop plate 21 and the left C-clip 37. The gap $\alpha_1$ permitting the rightward movement of the stop plate 21 is smaller than a gap between the right side of the stop plate 21 and a left side of the planetary gear carrier 9, thereby avoiding a contact between the stop plate 21 and the planetary gear carrier 9 during engagement of the main clutch Mc.

The structure of a pilot clutch Pc for causing the main clutch Mc to generate an engaging force will be described below.

Referring to FIG. 4, a plurality of pilot clutch outer disks 25 are axially slidably supported on a serration 24 formed around an inner periphery of the intermediate casing 3. A plurality of pilot clutch inner disks 26 are axially slidably supported on a serration 28 formed around a first cam ring 27 which will be described hereinafter. The pilot clutch inner disks 26 are alternately superposed on the pilot clutch outer disks 25. An annular armature 29 is axially slidably supported to the right side of the rightmost pilot clutch outer disk 25 to clamp the pilot clutch outer disks 25 and the pilot clutch inner disks 26 by cooperation with the right side of the left casing 2.

A solenoid 31 is supported on an outer periphery of the left casing 2 with two ball bearings 30 interposed therebetween. The solenoid 31 is energized by a command from a control unit which is not shown, thereby attracting the armature 29 leftwardly by a magnetic force of the solenoid 31. This causes the pilot clutch outer disks 25 and the pilot clutch inner disks 26 to abut against each other to engage the pilot clutch Pc.

Figure 5:
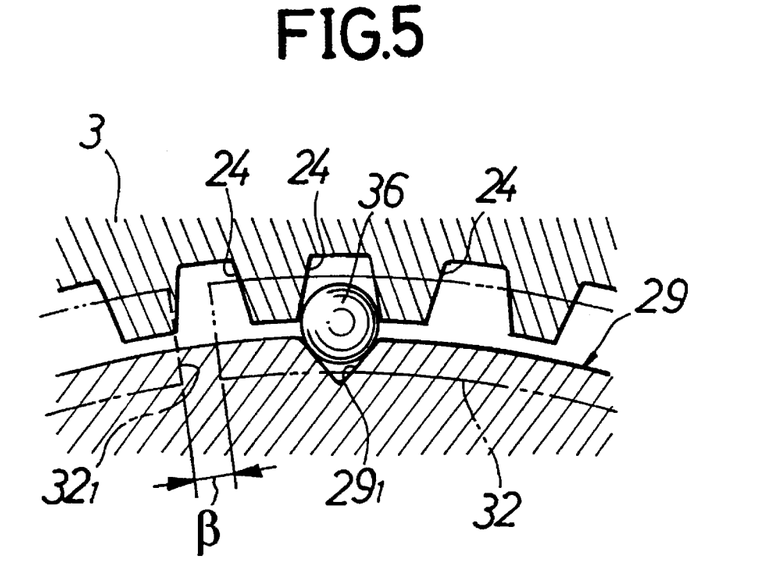
FIG. 5 is a sectional view taken along a line 5—5 in FIG. 4.

As can be seen from reference also to FIG. 5, a plurality of (e.g., two or four) ball grooves $29_1$ are defined in an outer periphery of the armature 29. Balls 36 are in engagement with the ball grooves $29_i$ and the serration 24 opposed thereto. This prevents the armature 29 from being rotated relative to the intermediate casing 3, but enables the armature 29 to be axially slided smoothly. The end of rightward movement of the armature 29 is limited by a C-clip 32 engaging the serration 24. This C-clip 32 also functions as a member for preventing the falling-off of the balls 36. In this case, the falling-off of the balls 36 from opened ends $32_1$ of the C-clip 32 is prevented by forming a gap β between the opened ends $32_1$ of the C-clip 32 at a value smaller than the diameter of the ball 36.

By locking the outer periphery of the armature 29 to a side of the differential case 1 with the balls 36 interposed therebetween, the inertia moment of the first cam ring 27 can be reduced, as compared with the case where the inner periphery of the armature 29 is locked to a side of the first cam ring 27. Therefore, it is possible to prevent an unnecessary engagement from being produced in the main clutch Mc and to reduce the load of the pilot clutch Pc during engagement of the latter, and moreover to prevent deflection of the armature 29 to stabilize the rotation of the latter. In addition, since the armature 29 and the differential case 1 are in contact with each other through the balls having a small contact area, it is possible not only to perform the axial movement of the armature 29 smoothly, but also to prevent leakage of the magnetic force thereby to prevent a reduction in attracting force of the solenoid 31.

The structure of a cam mechanism C for increasing the engaging force for the pilot clutch Pc to transmit it to the main clutch Mc will be described below.

Figure 3:
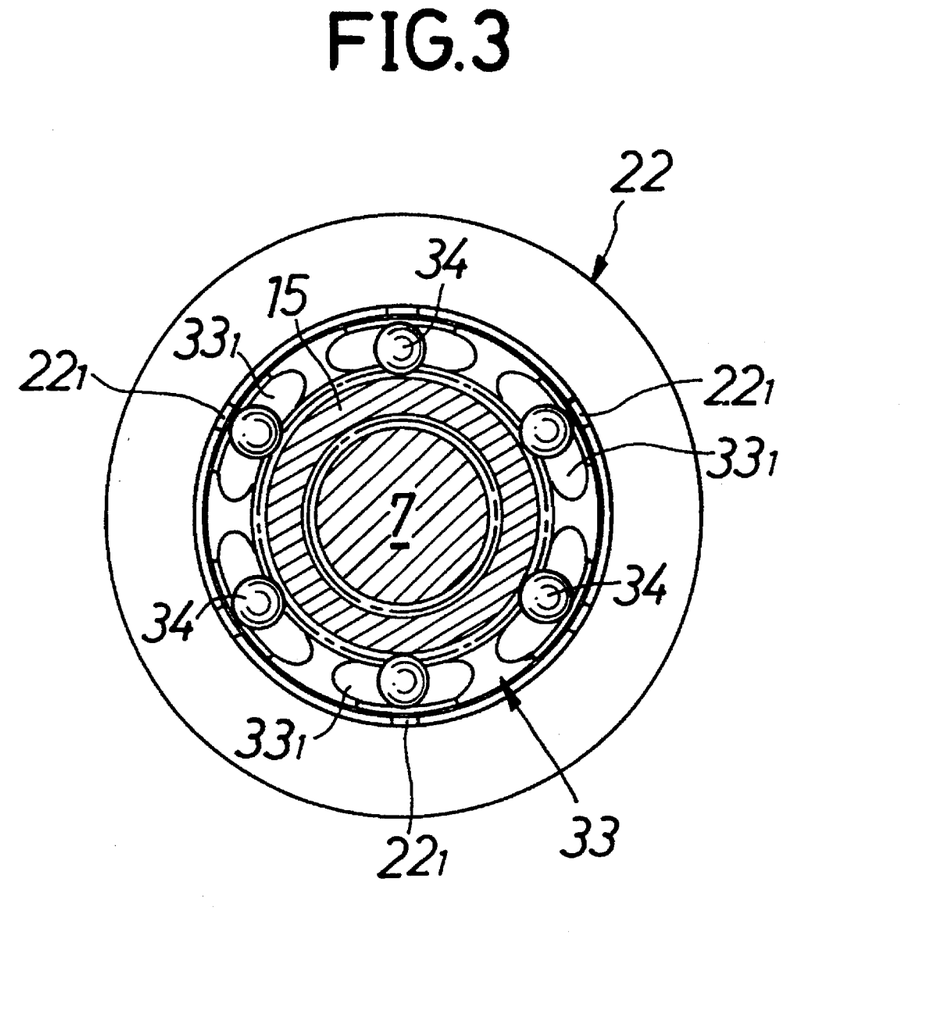
FIG. 3 is a sectional view taken along a line 3—3 in FIG. 1.

As shown in FIGS. 3 and 4, the cam mechanism C includes the first cam ring 27, a second cam ring 33 and a plurality of balls 34. The first cam ring 27 is relatively rotatably carried around the outer periphery of the sleeve 15, with its left end face supported on a right end face of the left casing 2 via a thrust bearing 35. The second cam ring 33 is axially slidably spline-coupled to the outer periphery of the sleeve 15 and further, the pressure plate 22 is axially slidably spline-coupled to an outer periphery of the second cam ring 33.

Figure 8:
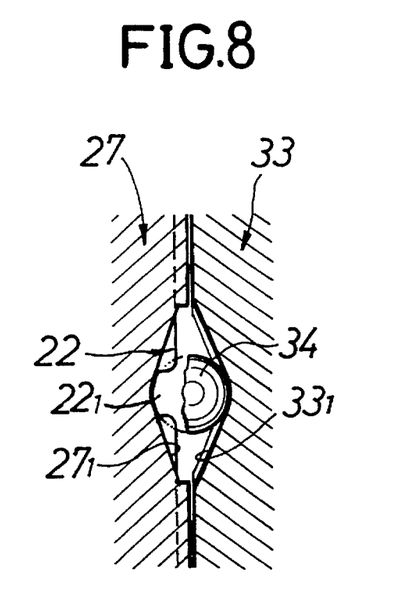
FIG. 8 is a sectional view taken along a line 8—8 in FIG. 4.
Figure 9:
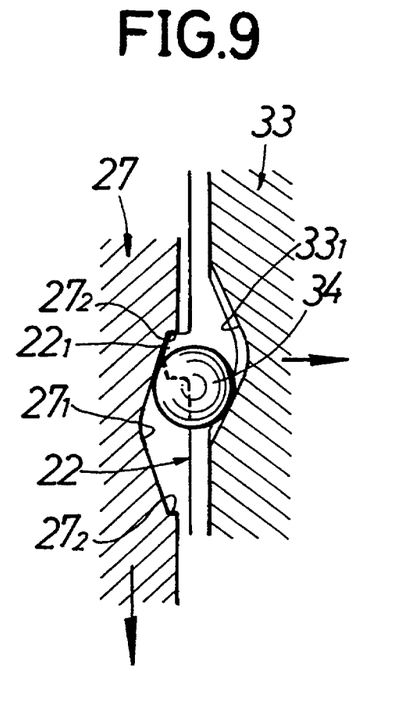
FIG. 9 is a view similar to FIG. 8 for explaining an operation.
Figure 10:
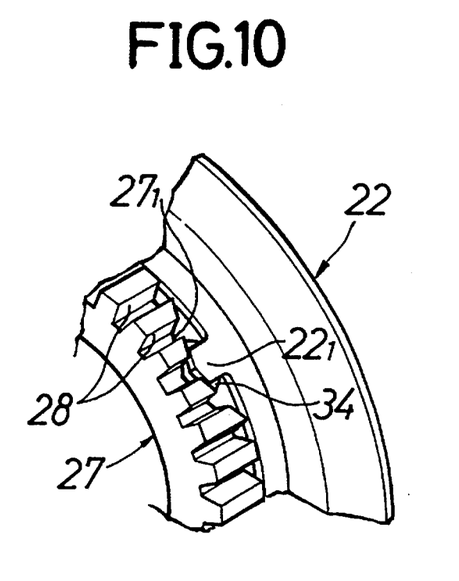
FIG. 10 is a partial perspective view of a cam mechanism.

As can be seen from reference also to FIGS. 8 to 10, six cam grooves $27_1$ and $33_1$ are defined in a right end face of the first cam ring 27 and a left end face of the second cam ring 33, respectively. The ball 34 serving as a rolling member is clamped between each of the cam grooves $27_1$ and each of the cam grooves $33_1$. Six projections $22_1$ each having a sharpened tip end are provided at a tip end of a boss portion extending leftwardly from a central portion of the pressure plate 22, and are engaged into the six cam grooves $27_1$ in the first cam ring 27, respectively. The formation of the cam grooves $27_1$ in the first cam ring 27 to be engaged by the projections $22_1$ of the pressure plate 22 can also contribute to a reduction in inertia moment of the first cam ring 27.

The second cam ring 33 spline-coupled to the sleeve 15, the pressure plate 22 spline-coupled to the second cam ring 33, and the first cam ring 27 connected to the second cam ring 33 through the balls 34 and the cam grooves $27_1$ and $33_1$ and also connected to the pressure plate 22 through the projections $22_1$ and the cam grooves $27_1$, are all rotated in unison with the sleeve 15.

Figure 6:
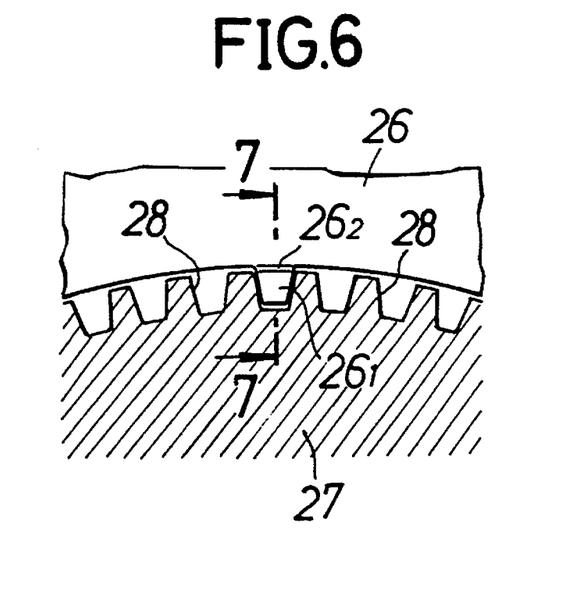
FIG. 6 is a sectional view taken along a line 6—6 in FIG. 4.
Figure 7:
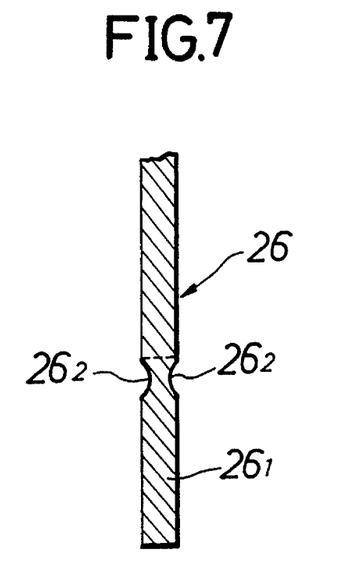
FIG. 7 Is a sectional view taken along a line 7—7 in FIG. 6.

As can be seen from FIGS. 4, 6 and 7, the number of projections $26_1$ for coupling the pilot clutch inner disks 26 to the serration 28 of the first cam ring 27 is set smaller (e.g., 8 in all) than the number of grooves in the serration 28. Moreover, grooves $26_2$ are defined in opposite surfaces of a base portion of each projection $26_1$. Therefore, if an excessive load is applied to the pilot clutch Pc, then the projection $26_1$ is broken at the groove $26_2$, thereby making it possible to minimize the damage to the entire rear differential D to prevent a differential lock.

The pair of grooves $26_2$ in the pilot clutch inner disk 26 contribute to an improvement in lubrication of the pilot clutch Pc by an oil retained therein. Further, the serration grooves in the first cam ring 27 which are not engaged by the projections $26_1$ of the pilot clutch inner disk 26 also contribute to an improvement in lubrication of the pilot clutch Pc by an oil retained therein.

As is apparent from FIG. 4, the pressure plate 22 is formed at a right end of an inner periphery thereof with a stepped portion $22_2$ which is abuttable against a right end of the second ring 33. When the main clutch Mc is in an initial engaged state under the influence of a biasing force of the belleville spring 23, a slight gap α3 is formed between the second cam ring 33 and the stepped portion $22_2$.

As can be seen from FIG. 9, a pair of stepped portions $27_2$ are formed at opposite ends of the cam groove $27_1$ in the first cam ring 27, so that the projection $22_1$ of the pressure plate 22 rotated in unison with the second cam ring 33 can be put into abutment against the stepped portions $27_2$ so as to define a limit of an angle of relative rotation of the first and second cam rings 27 and 33.

The operation of the embodiment of the present invention having the above-described construction will be described below.

If the loads of the left and right axles 7 and 8 are equal when a driving force of the engine has been transmitted through the follower bevel gear 6 to the differential case 1, the rotation of the differential case 1 is transmitted through the ring gear 13, the outer planetary gear 12, the inner planetary gear 14, the sun gear 16 and the sleeve 15 to the left axle 7, and also from the outer planetary gear 12 and the inner planetary gear 14 through the planetary gear carrier 9 to the right axle 8 to rotate both the axles 7 and 8 at the same speed. If a difference is produced between loads of the left and right axles 7 and 8, the rotation of the differential case 1 is differentially distributed to the left and right axles 7 and 8 by the relative rotation of the ring gear 13 and the sun gear 16 caused by the rotations and revolutions of the planetary gears 12 and 14.

If the solenoid 31 of the pilot clutch Pc is energized for limiting the differential motion between the left and right axles 7 and 8, the armature 29 is attracted and moved leftwardly by the solenoid 31, so that the pilot clutch outer disks 25 and the pilot clutch inner disks 26 are brought into contact with each other. As a result, the pilot clutch Pc is brought into an engaged state, so that the first cam ring 27 of the cam mechanism C is restrained to the intermediate casing 3, i.e., to the differential case 1. At this time, if there is any difference in rotation between the sleeve 15 spline-coupled to the left axle 7 and the differential case 1, the first and second cam rings 27 and 28 are rotated relative to each other, as shown in FIG. 9. As a result, the balls 34 urged into the cam grooves $27_1$ in the first cam ring 27 urge the cam grooves $33_1$ in the second cam ring 33, causing the second cam ring 33 to be moved rightwardly toward the main clutch Mc.

When the second cam ring 33 has been moved rightwardly, the pressure plate 22 with the stepped portion $22_2$ thereof urged against the right end of the second cam ring 33 is moved rightwardly. As a result, the main clutch outer disks 18 and the main clutch inner disks 19 of the main clutch Mc are urged rightwardly. The stop plate 21 is caused to abut against the right C-clip 38 against the biasing force of the belleville spring 23, thereby bringing the disks 18 and 19 into abutment against each other. Thus, the center casing 4, i.e., the differential case 1 and the sleeve 15, i.e., the left axle 7, are integrally coupled to each other to lock the planetary gear type differential P, so that the differential motion between the left and right axles 7 and 8 is limited.

In the above manner, a small engaging force of the pilot clutch Pc can be converted into a large axial thrust force by the cam mechanism C, and the pressure plate 22 can be operated by this thrust force to produce a large engaging force in the main clutch Mc.

At this time, the main clutch Mc can smoothly be brought into an engaged state by an effect of the gap $\alpha_1$ formed between the stop plate 21 and the C-clip 38. When the first and second cam ring 27 and 33 are relatively rotated with respect to each other, due to a sudden variation in wheel speed, the gap $\alpha_3$ formed between the second cam ring 33 and the pressure plate 22 acts as a dead zone or dead bank of the cam mechanism C. This makes it possible to prevent a sudden engagement of the main clutch Mc.

When the main clutch Mc is in its initial engaged state under an influence of the biasing force of the belleville spring 23, the biasing force of the belleville spring 23 is transmitted through the stop plate 21, the main clutch outer disks 18, the main clutch inner disks 19, the pressure plate 22, the first cam ring 27 and the thrust bearing 35 to the left casing 2. This generates a predetermined engaging force in the main clutch Mc to perform a limitation of the differential motion, thereby enabling an improvement in travel stability, for example, when the vehicle is subjected to a side wind during straight traveling at a high speed. If the solenoid 31 is always energized to generate an engaging force in the main clutch Mc in order to improve the stability against the side wind, problems of adsorption of an iron powder and a rise in temperature may arise in the solenoid 31 However, such problems can be avoided by generating an engaging force in the main clutch by means of the belleville spring 23. In addition, a seizure of the left casing 2 is prevented by receiving the load of the belleville spring 23 by the thrust bearing 35.

As shown in FIG. 9, the abutment of the projections $22_1$ of the pressure plate 22 biased by the belleville spring 23 against the cam grooves $27_1$ in the first cam ring 27 causes both of the pressure plate 22 and the first cam ring 27, i.e., both of the second cam ring 33 and the first cam ring 27 to be biased toward a centering position (a position shown in FIG. 8). As a result, when the pilot clutch Pc has been brought into its engaged state, the cam mechanism C can always be operated with a given responsiveness, irrespective of the direction of relative rotation of the first and second cam rings 27 and 33. In addition, if the angle of relative rotation of the first and second cam rings 27 and 33 is intended to increase in excess of an acceptable value, the projection $22_1$ of the pressure plate 22 is put into abutment against one of the stepped portions $27_2$ formed at opposite ends of the cam groove $27_1$ to inhibit an excessive increase in such angle of relative rotation. This makes it possible to prevent a locking of the planetary gear type differential P due to an unnecessary engagement of the main clutch Mc. Further, the projection $22_1$ is in a position to cover a radial outer portion of the ball 34, and functions to prevent the ball 34 from being ejected by centrifugal force.

It should be noted that by setting the gap $\alpha_2$, formed between the stop plate 21 and the C-clip 37, at a predetermined size, it is possible to prevent the biasing force of the belleville spring 23 from acting on both the disks 18 and 19, when the friction material of the main clutch outer disks 18 has been worn, thereby preventing the metal portions of the disks 18 and 19 from being brought into contact with each other.

Figure 11:
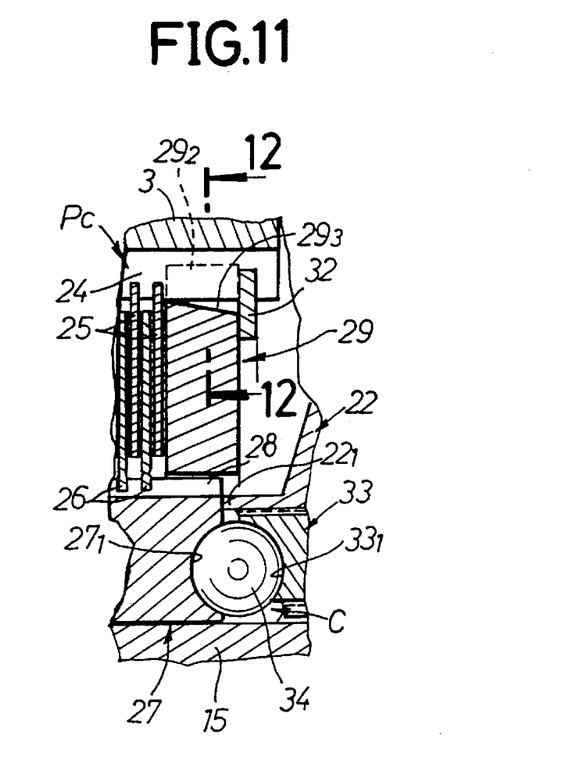
FIG. 11 is a partial sectional view similar to FIG. 4.
Figure 12:
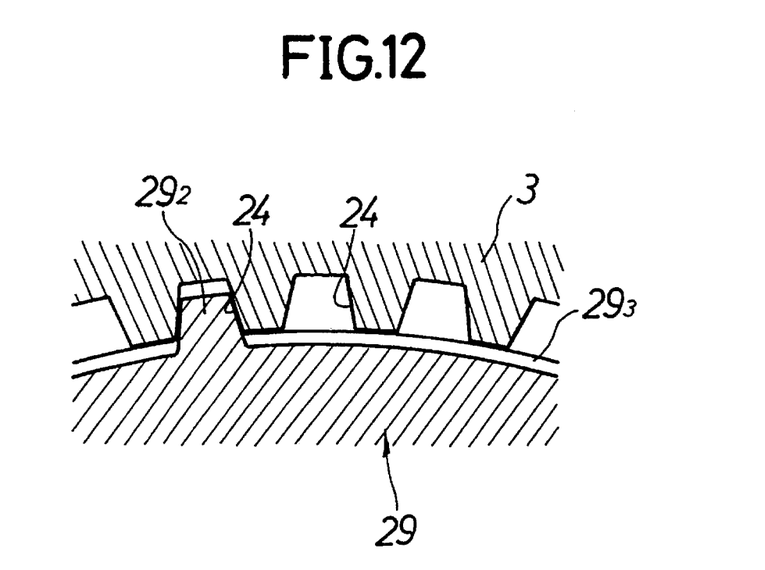
FIG. 12 is a sectional view taken along a line 12—12 in FIG. 11.

FIGS. 11 and 12 illustrate another embodiment of the present invention.

In this embodiment, a plurality of projections $29_2$ provided around the outer periphery of the armature 29 are in slidable engagement with the serration 24 of the intermediate casing 3, whereby the armature 29 is prevented from being rotated. An outer peripheral surface of the armature 29 is inclined, so that the diameter of the armature 29 is gradually decreased rightwardly and hence, the armature 29, at its left end face having the largest diameter, is in sliding contact with a tip end of the serration 24. Thus, it is possible to reduce the frictional force against the serration, while insuring a sufficient area at a side of the armature 29 opposed to the solenoid 31 to prevent a reduction in attractive force, and also to permit the armature 29 to be returned smoothly.

Although the embodiments of the present invention have been described in detail, it will be understood that the present invention is not limited to the above-described embodiments, and various modifications in design can be made without departing from the spirit and scope of the invention defined in the claims.

For example, in place of the planetary gear type differential P in the embodiment, a usual bevel gear type differential can be used. In addition, the present invention is not limited to the differential motion limiting mechanism in the embodiment, but is also applicable to a proper connecting system for releasably connecting a driving side and a follower side in a power transmitting arrangement.

What is claimed is:

1. A connecting system comprising a pilot clutch brought into an engaged state by an actuator, a cam means operated by an engaging force of the pilot clutch, an urging member driven and moved by the cam means, and a main clutch brought into an engaged state by a movement of the urging member, said cam means being comprised of a first cam ring restrained by the pilot clutch, a second cam ring provided on the urging member, and a rolling member interposed between the first and second cam rings for converting a relative rotation of both the cam rings into a thrust, said system further including a biasing means for biasing said urging member and said first cam ring toward an abutment against each other in order to generate a frictional force between said urging member and said first cam ring by said abutment, and means for providing a dead zone in an operation of said cam means.

2. A connecting system according to claim 1, wherein said second cam ring is relatively movably supported on said urging member, and said means for providing a dead zone in an operation of said cam means comprises a gap formed between said urging member and said second cam ring when said pilot clutch is in a non-engaged state.

3. A connecting system according to claim 1 or 2, wherein said biasing means biases said main clutch in an engaging direction.

4. A connecting system according to claim 1 or 2, further including a phase angle adjusting means for centering the first and second cam rings.

5. A connecting system according to claim 1 or 2, further including a limiting means for defining an upper limit of an angle of the relative rotation between said first and second cam rings.

6. A connecting system according to claim 1 or 2, further including projections provided on a clutch disk of said pilot clutch to engage grooves of a serration formed on the first ring of the cam mechanism, a number of said projections being smaller than a number of the grooves of said serration.

7. A connecting system according to claim 1 or 2, further including grooves formed in projections of a clutch disk of the pilot clutch which engage grooves of a serration formed on the first cam ring of the cam mechanism.

8. A connecting system according to claim 5, wherein said limiting means is comprised of a cam groove for supporting said rolling member, and a projection for engaging said cam groove, said projection being disposed radially outside said rolling member.

9. A connecting system according to claim 1, wherein said connecting system further includes a casing which is rotatable and which accommodates said pilot clutch, an armature attracted and moved by a solenoid to bring said pilot clutch into an engaged state, said cam means, said urging member and said main clutch, and wherein an outer periphery of said armature is engaged with said casing in a state where a relative rotation of said armature with respect to said casing is limited and an axial movement of said armature relative to the casing is permitted.

10. A connecting system according to claim 9, wherein the outer periphery of said armature is engaged with said casing through a second rolling member.

11. A connecting system according to claim 10, wherein an end of the axial movement of said armature is limited by a C-clip locked to said casing, and a gap between opened ends of the C-clip is set smaller than an outer diameter of said rolling member.

12. A connecting system according to claim 3, further including a phase angle adjusting means for centering the first and second cam rings.

13. A connecting system according to claim 3, further including a limiting means for defining an upper limit of angle of the relative rotation between said first and second cam rings.

14. A connecting system according to claim 3, further including projections provided on-a clutch disk of said pilot clutch to engage grooves of a serration formed on the first ring of the cam mechanism, the number of said projections being smaller than the number of grooves of said serration.

15. A connecting system according to claim 3, further including grooves formed in projections of a clutch disk of the pilot clutch which engage grooves of a serration formed on the first cam ring of the cam mechanism.

16. A connecting system according to claim 13, wherein said limiting means is comprised of a cam groove for supporting said rolling member, and a projection for engaging said cam groove, said projection being disposed radially outside said rolling member.

17. A connecting system according to claim 1, wherein said urging member and said second cam ring are formed separate from each other.

18. A connecting system according to claim 17, wherein said second cam ring is provided radially inside of said urging member and is slidable relative to said urging member.

19. A connecting system according to claim 1 or 17, wherein said first cam ring and said urging member are placed in abutment against each other at a location radially outside of said rolling member.

20. A connecting system according to claim 18, wherein said second cam ring is spline-connected to said urging member axially slidably.

21. A connecting system according to claim 1 or 17, wherein said actuator is a solenoid and an armature is provided in opposite relation with respect to said solenoid, said urging member and said first cam ring being placed in abutment against each other at a location radially inside of said armature.

22. A connecting system according to claim 1 or 17, wherein said first cam ring and said urging member are directly engaged with each other.

23. A connecting system according to claim 1, wherein said rolling member is provided as a plurality of rolling members which are distanced circumferentially from each other.

* * * * *